United States Patent
Bestebner

(10) Patent No.: US 10,274,088 B2
(45) Date of Patent: Apr. 30, 2019

(54) CLOSURE ELEMENT FOR A VACUUM VALVE WITH PRESSED-OFF, VULCANIZED-ON SEAL

(71) Applicant: VAT HOLDING AG, Haag (CH)

(72) Inventor: Jürgen Bestebner, Koblach (AT)

(73) Assignee: VAT HOLDING AG, Haag (CH)

( * ) Notice: Subject to any disclaimer, the term of this patent is extended or adjusted under 35 U.S.C. 154(b) by 187 days.

(21) Appl. No.: 14/822,790

(22) Filed: Aug. 10, 2015

(65) Prior Publication Data
US 2016/0040789 A1   Feb. 11, 2016

(30) Foreign Application Priority Data
Aug. 11, 2014   (EP) .................................... 14180492

(51) Int. Cl.
*F16K 3/02*   (2006.01)
*B23P 15/00*   (2006.01)
(Continued)

(52) U.S. Cl.
CPC .......... *F16K 3/0227* (2013.01); *B23P 15/001* (2013.01); *B29C 43/18* (2013.01);
(Continued)

(58) Field of Classification Search
CPC ........ B23P 15/001; F16K 3/0227; F16K 3/18; F16K 51/02; G16J 15/108; G16J 15/106; G16J 15/123; G16J 15/14
(Continued)

(56) References Cited

U.S. PATENT DOCUMENTS 3,090,996 A   5/1963   Reichenbach et al.
3,575,377 A * 4/1971   Carlton ................... F16K 3/188
                                                137/242
(Continued)

FOREIGN PATENT DOCUMENTS

CN   101189697 A   5/2008
CN   101375090 A   2/2009
(Continued)

OTHER PUBLICATIONS

European Search Report dated Jan. 28, 2015 as received in Application No. 14 18 0492.

*Primary Examiner* — Kevin F Murphy
*Assistant Examiner* — Kelsey E Cary
(74) *Attorney, Agent, or Firm* — Maschoff Brennan

(57) ABSTRACT

Some embodiments may include a closure element for a vacuum valve that may be configured, for example, for the gastight closing of a process volume by means of cooperation with a vacuum valve opening of the vacuum valve. In some embodiments, the closure element may include a first sealing surface, corresponding to a second sealing surface of the vacuum valve opening, wherein the second sealing surface surrounds the vacuum valve opening, and a sealing material vulcanized onto the first sealing surface and in accordance with its course and having a defined height in the direction of the surface normal of the first sealing surface. In some embodiments, the sealing material may have a defined shape with respect to a sealing material cross section, comprising a first seal portion, provided on the process volume side, and a second seal portion, provided, in particular, facing away from the process volume.

15 Claims, 6 Drawing Sheets

(51) Int. Cl.
   *B29C 43/18*   (2006.01)
   *F16K 51/02*   (2006.01)
   *B29C 43/38*   (2006.01)
   *F16J 15/10*   (2006.01)
   *F16J 15/12*   (2006.01)
   *F16K 3/18*    (2006.01)
   *F16J 15/14*   (2006.01)
   *B29C 70/74*   (2006.01)

(52) U.S. Cl.
   CPC ............ *B29C 43/38* (2013.01); *B29C 70/745* (2013.01); *F16J 15/106* (2013.01); *F16J 15/108* (2013.01); *F16J 15/123* (2013.01); *F16J 15/14* (2013.01); *F16K 3/18* (2013.01); *F16K 51/02* (2013.01)

(58) Field of Classification Search
   USPC ........ 251/327, 328, 329, 301; 277/560, 641, 277/644
   See application file for complete search history.

(56) References Cited

U.S. PATENT DOCUMENTS

| | | |
|---|---|---|
| 4,809,950 A | 3/1989 | Geiser |
| 4,824,357 A | 4/1989 | Christiansen |
| 4,881,717 A | 11/1989 | Geiser |
| 6,056,266 A | 5/2000 | Blecha |
| 6,089,537 A | 7/2000 | Olmsted |
| 6,416,037 B1 | 7/2002 | Geiser |
| 6,629,682 B2 | 10/2003 | Duelli |
| 8,181,972 B2 | 5/2012 | Tsuji |
| 2002/0088959 A1* | 7/2002 | Duelli ................... F16K 51/02 251/158 |
| 2006/0273277 A1 | 12/2006 | Heller et al. |
| 2006/0287438 A1 | 12/2006 | Mansfield et al. |
| 2008/0315141 A1* | 12/2008 | Thrash ................... F16K 51/02 251/170 |
| 2009/0045371 A1 | 2/2009 | Kamibayashiyama |
| 2009/0250649 A1* | 10/2009 | Tsuji ..................... F16K 51/02 251/366 |
| 2011/0169229 A1 | 7/2011 | Hamade et al. |
| 2014/0175310 A1* | 6/2014 | Coppola ................ F16K 51/02 251/85 |

FOREIGN PATENT DOCUMENTS

| | | |
|---|---|---|
| DE | 39 16 080 A1 | 11/1989 |
| DE | 10 2007 048 252 A1 | 4/2009 |
| EP | 2 420 709 A1 | 2/2012 |
| JP | H06-241344 A | 8/1994 |
| WO | 2010032722 A1 | 3/2010 |

* cited by examiner

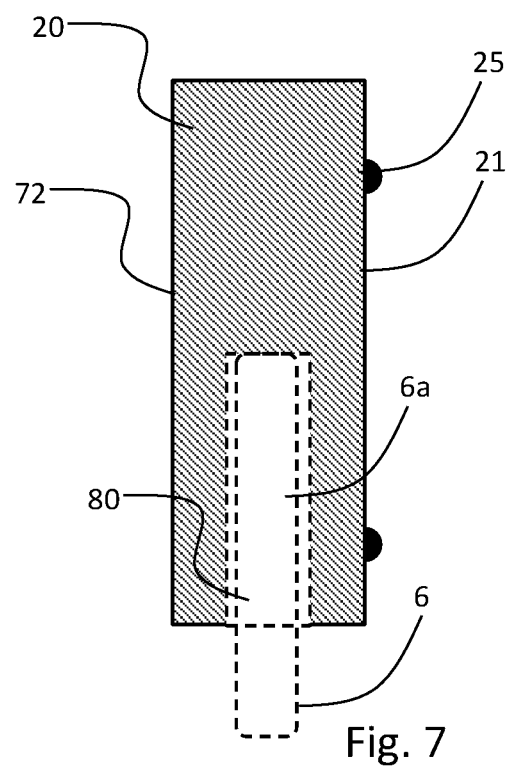

CLOSURE ELEMENT FOR A VACUUM VALVE WITH PRESSED-OFF, VULCANIZED-ON SEAL

FIELD OF THE INVENTION

The invention relates to a closure element for a vacuum valve for the gastight closing of a flow path, a corresponding vacuum valve, and a tool and a method for manufacturing such a closure element.

BACKGROUND

Vacuum valves for the substantially gastight closing of a flow path which leads through an opening shaped in a valve housing are commonly known in different embodiments from the prior art. Vacuum gate valves are used, in particular, in the field of IC and semiconductor production, which must take place in a protected atmosphere, as far as possible without the presence of contaminating particles. For instance, in a production plant for semiconductor wafers or liquid crystal substrates, the highly sensitive semiconductor or liquid crystal elements pass sequentially through a plurality of process chambers, in which the semiconductor elements located within the process chamber are machined by means of, in each case, a machining device. Both during the machining process within the process chamber and during the transport from process chamber to process chamber, the highly sensitive semiconductor elements must be constantly in a protected atmosphere—in particular in a vacuum. The process chambers are connected to each other, for instance, via connecting passages, wherein the process chambers can be opened by means of vacuum gate valves for transfer of the parts from one to the next process chamber and, subsequent to implementation of the respective production step, closed in a gastight manner. Due to the described field of application, valves of this type are also referred to as vacuum transfer valves and, due to their rectangular opening cross section, also as rectangular gate valves.

Since transfer valves are used, inter alia, in the manufacture of highly sensitive semiconductor elements, the particle generation caused, in particular, by the actuation of the valve, and the number of free particles in the valve chamber, must be kept as low as possible. The particle generation is primarily a consequence of friction, for instance by metal-metal contact and by abrasion.

The sealing can be effected, for example, either via a seal disposed on the closure side of the closure plate, which seal is pressed onto the valve seat surrounding the opening, or via a sealing ring on the valve seat, against which the closure side of the closure plate is pressed. Different sealing devices are known from the prior art, for instance from U.S. Pat. No. 6,629,682 B2 (Duelli). A suitable material for sealing rings is, for instance, the elastic sealing material known under the trade name Viton®.

The requirements which are placed on the seals used in vacuum valves are very high. On the one hand, in the closed state of the valve, the leak-tightness of the valve must be ensured. This is a big challenge, above all due to the, in the vacuum sector, high differential pressures, and the thus generated large forces acting on the valve shutter. Since, in the case of excessively high compressions, the seals used are subjected to above-average, high wear or are destroyed, the structure of the valve must be such that the differential pressure forces cannot, or can only to a limited degree, act on the seals. The compression of the seal should be effected as evenly as possible along its course, which calls for a uniform pressing force of the valve disk upon the valve seat throughout the contact zone. Above all, transverse loads and longitudinal loads upon the seal should be kept as low as possible. In the case of transverse loads transversely to the longitudinal direction of the seal, in O-ring seals there is the danger that they will be torn out of their mounting, in particular the groove, in which they are fixed. Vulcanized-on seals, too, may only be exposed to very limited transverse forces. Both in the open and in the closed state of the valve, the seals are in part exposed to aggressive mediums and must therefore either be of such a nature that they can withstand the influences, and/or are moved out of the flow path of the medium, also in order to avoid abrasion.

Excessively high wear upon the seal represents an uncertainty factor for process reliability and calls for a regular exchange of the seal, which in turn leads to increased downtimes within the process.

Different embodiments of vacuum valves, in particular their sealing and drive technologies, are known from the prior art, which embodiments have, inter alia, the aim of increasing the service life of the seals used and also have improved process reliability.

Depending on the respective drive technologies, a distinction is drawn, in particular, between gate valves, also termed spool valves or rectangular gate valves, and shuttle valves, wherein in the prior art the closing and opening is generally effected in two steps. In a first step, a valve shutter member, in particular a closure plate or a closure element, in the case of a gate valve, as is known, for instance, from U.S. Pat. No. 6,416,037 (Geiser) or U.S. Pat. No. 6,056,266 (Blecha), in particular an L-type gate valve, is linearly displaced over an opening in a motion substantially parallel to the valve seat, or in the case of a shuttle valve, as is known, for instance, from U.S. Pat. No. 6,089,537 (Olmsted), is pivoted over the opening about a pivot axis, without contact being made between the closure plate and the valve seat of the valve housing. In a second step, the closure plate is pressed with its closure side onto the valve seat of the valve housing, so that the opening is closed in a gastight manner. The sealing can be realized, for example, either via a seal disposed on the closure side of the closure plate, which seal is pressed onto the valve seat surrounding the opening, or via a sealing ring on the valve seat, against which the closure side of the closure plate is pressed. The seal, in particular the sealing ring, can be held in a groove and/or vulcanized on.

The described two-stage motion, in which the closure member is firstly slid transversely over the opening without the seal making contact with the valve seat, and the closure member is subsequently pressed substantially perpendicularly onto the valve seat, has, besides the possibility of precise regulation of the flow, above all the advantage that the seal is compressed almost exclusively perpendicularly, without this resulting in a transverse or longitudinal load on the seal. The drive has a relatively complex structure, which in particular is formed either by a single drive, which enables an L-shaped motion of the closure member, or by a plurality of drives, for instance two linear drives or one linear drive and a spreading drive. Spreading drives, which are generally disposed directly behind the closure plate and displace this, relative to the shank on which they are found, in the perpendicular direction onto the valve seat, have inside the valve a multiplicity of mechanical parts which perform relative motions with respect to one another.

Wedge valves, which are adjusted only linearly, enable a significantly higher adjustment speed, yet, due to the transverse loading of the seal, are in part barely suitable for the vacuum sector, and if at all, then only for a small number of adjustment cycles.

This problem is solved by means of gate valves in which, even though the closing and sealing operation is effected via a single linear motion, the sealing geometry is such that a transverse loading of the seal is wholly avoided. Such a valve is, for instance, the transfer valve known under product designation "MONOVAT Series 02 and 03", and configured as a rectangular insert valve, of the company VAT Vakuumventile AG in Haag, Switzerland. The structure and working method of such a valve are described, for instance, in U.S. Pat. No. 4,809,950 (Geiser) and U.S. Pat. No. 4,881,717 (Geiser).

The valve which is described there possesses in its housing a sealing surface, which, viewed in the direction of the axis of the valve passage opening, possesses portions situated one behind the other, which, via smooth curves, pass into laterally outward running, flat sealing surface portions, wherein the imaginary generatrices of this sealing surface, which is in one piece yet has a plurality of portions, lie parallel to the axis of the valve passage opening. The sealing surface is machine-worked. The closure member possesses a thereto corresponding bearing surface for the peripherally closed seal. Described in greater detail, the so-called valve slide possesses a valve housing and a valve passage opening, which can be closed with a closure member which is displaceable in its plane. In the region of the valve passage opening is provided a sealing surface, against which, in the closing position of the closure member, bears a peripherally closed seal disposed on said closure member, wherein the imaginary, straight generatrices of the sealing surface lie parallel to the axis of the valve passage opening. The peripherally closed, one-piece seal has portions of different lengths and/or shapes, which lie in different planes, wherein two main portions of the peripherally closed seal lie in planes which stand at right angles to the axis of the valve passage opening and are spaced apart. The two main portions of the seal are connected by side portions. The closure member possesses, in relative to the course of the sealing surface of the housing, a correspondingly running face supporting the peripherally closed seal. The side portions of the peripherally closed seal extend in a U-shape. Respectively the branches of these side portions extending in a U-shape lie in one plane. Those portions of the sealing surface which, viewed in the axial direction of the valve passage opening, lie one behind the other, for the contact of the main portions of the seal in that region in which they possess a common, straight, axis-parallel generatrix, pass into laterally outward running flat sealing surface portions. These flat sealing surface portions lie in planes lying parallel to one another and to the axis of the valve passage opening.

A suitable drive for such a transfer valve which can be closed by means of a linear motion is represented in JP 6241344 (Buriida Fuuberuto). The drive which is described there possesses eccentrically mounted levers for the linear displacement of the push rods on which the closure member is mounted.

Substantially independent of the above-stated drive technologies for valve shutters are the designs for seals provided or applied on the closure element. As mentioned above, such a seal is typically realized as an O-ring in a groove or—for improved durability—is vulcanized onto the closure element by means of a special tool.

For the vulcanization of the seal, overflow gaps are provided in order that an excess of sealing material, for example elastomer, can be led off and the seal 100 can be created in accordance with the shape predefined by the tool (cf. FIG. 1a). However, the material 101,101' discharged through the overflow gaps remains on the plate blank 110, which is produced, for instance, from aluminum or special steel and has to be mechanically removed subsequent to the vulcanization. This removal is currently generally effected by means of trimming in the region of the metal/sealing material transition zone and results in a removal of both sealing material and metal, as shown in the regions 101 and 101' of FIG. 1b.

However, a major drawback with this process is the formation of particles and the formation of burrs in the removal of material by the trimming. Since precisely this particle formation and the lingering of such particles on the valve shutter element is extremely critical for the machining processes to be carried out in the vacuum sector, every effort has to be made to reduce or, ideally, totally avoid such particles.

SUMMARY

Some embodiments of the invention provide a closure plate or closure element for a vacuum valve, in particular a vacuum transfer valve, having a vulcanized-on seal, wherein improved process reliability is obtained.

In particular, some embodiments provide an appropriate closure element, wherein a production-related burr formation or the formation of residual particles at least in the part facing toward the process volume to be shut off is minimized or wholly avoided.

The invention relates to a closure element for vacuum valves, wherein the seal is applied to the closure element such that a following material-removing machining of the closure element, at least in those regions which during use are facing toward the process volume to be shut off, in particular are in direct contact with this volume, can be dispensed with. Thus no machine-cutting reworking of the closure element in these regions, for example trimming, is any longer necessary, whereby, broadly speaking, there is no formation of microparticles or burrs.

The closure element is generally the shutter (also referred to as the valve disk, closure plate or closure member) by means of which the opening in the vacuum valve can be closed in a gastight manner. In an arrangement in a vacuum valve of the generic type, the closure element, which can be configured, for instance, as a valve disk, is typically displaceable at least linearly along a geometric adjustment axis, running transversely to the opening axis, in a closure element plane between an open position and a closed position. Preferably, the adjustment axis runs perpendicular to the opening axis and lies on a plane which is breached perpendicularly by the opening axis.

Alternatively, the adjustment axis runs obliquely and non-parallel to the opening axis, wherein the angle of intersection is in particular between 90 degrees and 45 degrees.

In particular, the closure element is movable, moreover, in the direction of the opening axis, so that a closure of the valve opening by a substantially perpendicular pressing of the closure element onto the valve seat can be effected in a second stage of the motional sequence (L-type). As a result, a transverse loading of the vulcanized-on seal can be kept as small as possible, whereby the formation of abrasion particles is correspondingly reduced.

In concrete terms, the invention relates to a closure element, in particular a valve disk, for a vacuum valve, wherein the closure element is configured for the gastight close-off of a vacuum process volume by means of cooperation with a vacuum valve opening, provided for the process volume, of the vacuum valve.

The closure element is thus configured for the gastight closing of a valve opening for a flow path under vacuum conditions. By the flow path should be understood, in general terms, an opening path, which is to be closed, between two regions—in particular between two coating plants of any type, for instance for solar or other applications, or between a process chamber for semiconductor production and either a further process chamber or the outside world. The flow path is, for instance, a connecting passage between two interconnected process chambers, wherein the process chambers can be opened by means of the vacuum valve for transfer of the semiconductor parts from one to the next process chamber and, subsequent to implementation of the respective production step, can be closed in a gastight manner. Due to the described field of application, valves of this type are also referred to as vacuum transfer valves and, due to their often rectangular opening cross section, also as rectangular gate valves. Naturally, any other chosen application of the vacuum valve according to the invention for the substantially gastight closure of a chosen flow path is also possible, however.

The closure element has a first sealing surface corresponding, in particular in terms of shape and size, to a second sealing surface of the vacuum valve opening, wherein the second sealing surface surrounds the vacuum valve opening. The first sealing surface of the closure element thus corresponds, in particular in terms of shape and size, to the sealing surface surrounding the valve opening (in particular to the shape of the valve seat).

Moreover, the closure element has a sealing material which is vulcanized onto the first sealing surface and, in accordance with the course thereof, has a defined height in the direction of the surface normal of the first sealing surface, wherein the sealing material has a defined shape with respect to a sealing material cross section (cross section through the sealing material perpendicular to its direction of extent), comprising a first seal portion provided, in particular, on the process volume side (i.e. a portion which, given an arrangement in a vacuum valve and in the closed state, faces toward the process volume to be shut off or is in contact with this same), and a second seal portion, provided facing away from the process volume. Typically, closure elements of this type—thus also the closure element according to the invention—are configured such that, already on the basis of the design of the closure element, it is defined which part of the closure element and also of the sealing material, during use, comes into or is in contact with the process volume to be separated off (vacuum sector) and which second part remains outside this volume, i.e. in the closed state is not (directly) exposed to this process volume.

In terms of product quality, in particular with respect to purity, i.e. the presence of any particles or burrs, the first seal portion (i.e. that which in the closed valve state is facing toward the process volume) is the process-critical portion. In particular, this portion must not, as far as possible, have any impurities or material residues.

The closure element therefore has a compression adjoining the first seal portion and having a pressing edge. Moreover, the pressing edge is shaped and is configured with respect to the first seal portion such that the surface course of the sealing material, which surface course is given by the shape of the first seal portion and tapers into the pressing edge, (with respect to the cross section through the sealing material), is continued substantially homogeneously, in particular linearly, by the pressing edge (i.e. by virtue of the position and direction of the pressing edge relative to the tapering sealing material). This also comprises a slightly angled continuation of the surface course by means of the pressing edge.

The compression in the closure element is formed in the application and vulcanization of the sealing material. As a result, a material overflow in at least that direction which corresponds to the later (i.e. where the closure element is used in a vacuum valve) process side is prevented and, at the same time, the sealing material is formed on such that a homogeneous material transition is formed. A reworking of this (sealant/metal) transit region is thus no longer necessary, whereby a burr formation and a thereby induced particle formation can be largely prevented.

According to one specific embodiment of the invention, the closure element has a further compression having a further pressing edge, which adjoins the second seal portion. This second compression or pressing edge and the second seal portion are positioned relative to each other and respectively shaped such that the surface line, according to the principle of the first seal portion, is guided, on this side too, substantially homogeneously throughout.

With respect to the shaping of the first seal portion, according to one embodiment of the invention this is shaped, in a region adjoining the compression, such that in this region the surface course of the sealing material (in the cross sectional direction) is homogeneous and has a homogeneous curvature which produces an edgeless change of direction of the surface course, in particular between 75° and 105°, in particular 90°. As a result, a continuous transition of the surface line of the sealing material into the carrier material of the closure element is enabled, so that a flush-molded, neat seal can be created.

According to one particular embodiment of the invention, the curvature (in the region adjoining the compression) is free from turning points. In particular, the curvature has a constant direction of curvature. As a result of such a design of the first seal portion, a homogeneous course of the seal surface (in accordance with the seal cross section) and a corresponding transition to the carrier material is given.

In addition, according to one specific embodiment of the invention, the change of direction of the surface course in the region adjoining the compression amounts substantially to 90°.

With the creation of the compression in the closure element, in the course of the vulcanization of the sealing material an appropriate close-off of the vulcanization chamber can be procured. In order that this close-off is formed flush with and tight with the surface of the closure element, a pressing into the carrier material (=material of the closure element), in particular with a particular depth, is necessary. At the same time, moreover, the structure and stability of the closure element should remain unaffected. When the excess sealing material is removed according to the prior art, a material removal (for example by trimming) of the carrier material of the closure element (metal or alloy) in the region of 0.2 mm is created.

A further embodiment of the invention thus relates to the compression of the closure element, wherein the compression has a depth in the direction of the surface normal of the first sealing surface and with respect to the surface of this sealing surface within the range from 0.15 to 0.25 mm.

In particular, the pressing edge which is created by the compression has a length between 0.15 and 0.25 mm.

With respect to the shape of the compression, one embodiment of the invention has in particular the pressing edge such that this runs substantially parallel to the surface normal of the first sealing surface (viewed in cross section).

In terms of the surface properties created by the vulcanization process, it is advantageous that the surface, without a necessary reworking of the material, has a significantly lower surface roughness—compared with a vulcanization and a partial removal of the sealing material, wherein, following the machining, surface roughnesses of around $R_a=0.8$ µm or $R_z=7.0$ µm obtain. A lower surface roughness at the same time implies a diminution of the working surface in terms of, for example, a possible particle release.

According to the invention, the first seal portion has in particular, at least in the region adjoining the compression, a mean surface roughness $R_a$ between 0.02 µm and 0.15 µm, in particular between 0.05 µm and 0.1 µm.

Alternatively or additionally, the first seal portion has in particular, at least in the region adjoining the compression, an average surface roughness depth $R_z$ between 0.2 µm and 1.5 µm, in particular between 0.5 µm and 1 µm.

A surface state of this type is here achieved by an appropriately smooth tool surface, in particular of the recess in the tool, which recess is provided for the vulcanization.

According to one specific embodiment of the closure element, the sealing material consists at least partially, yet preferably mainly, of an elastomer. For instance, the sealing material has a fluoroelastomer, which is marketed, for example, under the designation Viton®-fluoroelastomer, for example Viton® A or Viton® B, or as Dai-El®-fluoroelastomer, for example Dai-El® G 902 etc., as Tecnoflon™ or Tecnoflon™-fluoroelastomer. The sealing material can also be based on a peroxide-curable fluorinated rubber compound, as is described, for instance, in DE 10 2007 048 252 A1 of the Applicant. Materials of this type offer, in particular, high resistance also to aggressive chemical mediums, such as, for example, a process gas present in the process volume.

According to a further embodiment according to the invention, the closure element has a coupling for connecting to a drive unit of a vacuum valve in order to provide a controlled motion of the closure element in the vacuum valve, in particular a receptacle for a push rod of the drive unit. In particular, the receptacle is shaped in the side of the closure element (with respect to a closure side of the closure element), for the removable mounting of the closure element on the push rod by engagement of a connecting portion of the push rod in the receptacle. Moreover, the push rod is supported and adjustable by means of the drive unit in particular such that the valve opening is closable by displacement of the closure element substantially along the push rod axis over a valve opening and pressing of the closure element with its sealing material onto a valve seat surrounding the valve opening.

By virtue of this coupling, the closure element is thus specifically configured for use in a vacuum valve, in particular of the L-type, and can thereby be connected to the drive unit and moved in the valve according to a defined pattern.

According to a further embodiment of the invention, the closure element has at least one grip recess, which is shaped in a side lying opposite the closure side with the vulcanized-on sealing material (of the closure element), for the manual application of force to the closure plate substantially along the push rod axis, in particular for the removal or mounting of the closure plate from or on the push rod.

For improved handling of the closure element during disassembly, for example, two grip recesses, for instance, are shaped in the side opposite the closure side in order to be able to manually apply a force to the closure element in a substantially upward direction for removal of the closure plate from the push rod and/or for better handling of the closure plate following disassembly. The grip recesses can be provided on the inside with a non-slip coating for improved grip.

The invention further relates to a vacuum valve for the gastight close-off of a process volume, comprising a valve housing, which has a vacuum valve opening and a valve seat surrounding the vacuum valve opening and having a second sealing surface. In addition, the vacuum valve has a closure element for the substantially gastight closure of the vacuum valve opening, having a first sealing surface corresponding to the second sealing surface, wherein the first sealing surface has a vulcanized-on sealing material having a defined height in the direction of the surface normal of the first sealing surface, and the sealing material has a defined shape with respect to a sealing material cross section, having a first seal portion, provided, in particular, on the process volume side, and a second seal portion, provided, in particular, facing away from the process volume.

The vacuum valve additionally has a drive unit coupled with the closure element, which drive unit is configured such that the closure element is adjustable at least substantially along a geometric longitudinal axis in a longitudinal closing direction from an open position, in which the closure element frees the vacuum valve opening, into a closing position, in which the first sealing surface of the closure element is pressed onto the second sealing surface and closes the vacuum valve opening in a substantially gastight manner, and back.

According to the invention, the closure element has a compression adjoining the first seal portion and having a pressing edge. Moreover, the pressing edge is shaped, and configured with respect to the first seal portion, such that the surface course of the first seal portion, which surface course is given by the shape of the first seal portion and tapers into the pressing edge, is continued (in relation to a cross section through the sealing material) homogeneously, in particular linearly.

In particular, the first seal portion is shaped, in a region adjoining the compression, such that in this region the surface course of the sealing material in a cross-sectional direction is homogeneous and has a homogeneous curvature which produces an edgeless change of direction of the surface course, in particular between 75° and 105°.

In particular, the closure element, by virtue of a mobility of the closure element substantially along a geometric transverse axis running at right angles to the longitudinal axis, can be adjustable by means of the drive unit in a transverse closing direction into an intermediate position (L-type valve shutter, i.e. L-shaped motional sequence), in which the closure element covers the opening and a closure side of the closure element is in a remote opposite position to the valve seat, and back.

Furthermore, the closure element of the vacuum valve according to corresponding specific embodiments of the invention is in particular configured according to one of the versions described above.

The invention further relates to a multifunctional tool for the application and shaping of a sealing material, in particular to an above closure element, to or on a material blank, comprising a recess defining the shape of the resulting, vulcanized sealing material, a press-off edge forming a first end of the recess with respect to a tool cross section, a slot connecting to the recess at its second end, and a receptacle for sealing material.

The recess is shaped, in a region adjoining the press-off edge, such that a course of the press-off edge with respect to the tool cross section is continued in this region by an adapted tool surface course substantially homogeneously, in particular linearly (i.e. also embracing a slight angular offset between press-off edge and further tool surface). Moreover, the multifunctional tool, upon closure of the tool, cooperates with the introduced material blank such that the press-off edge is compressed into the material blank and closes off the recess at its first end with the material blank, the slot forms an overflow channel, and the sealing material present in the receptacle is forced and/or flows through the overflow channel into the recess. In addition, the tool is configured such that the sealing material can then, in a closed tool state, be fully vulcanized.

In particular, the multifunctional tool, the material blank and/or the receptacle for the sealing material can be tempered according to a predetermined cross-linking curve. The material blank here forms, in particular, the closure element or a part of the closure element.

According to a further embodiment of the multifunctional tool, the recess is shaped, in the region adjoining the press-off edge, such that in this region the tool surface course along the tool cross section is homogeneous and has a homogeneous curvature producing an edgeless change of direction of the tool surface course, in particular between 75° and 105°. Alternatively or additionally, the tool can have a homogeneous transition of the surface line along the tool cross section from the press-off edge to the recess.

The invention further relates to a method for manufacturing a closure element having a seal for a vacuum valve, comprising a multifunctional tool as described, and comprising a material blank embodying the closure element or at least a part of the closure element.

In an open tool state, the material blank and a sealing material are introduced into the multifunctional tool, in particular into the receptacle for the sealing material. In a compression step, by closing of the multifunctional tool, the press-off edge is pressed into the material blank. As a result, a compression corresponding to the press-off edge and having a pressing edge is created in the material blank and the recess is shut off at its first end. Furthermore, the sealing material is deformed and/or liquefied such that at least a part of the sealing material makes its way into the recess through the overflow channel formed in the compression step by the slot of the multifunctional tool and fills said recess.

In a vulcanization step, a full vulcanization of the sealing material is then effected substantially in accordance with the shape of the recess in such a way that the sealing material is shaped, and configured with respect to the pressing edge, such that the surface course, created by the pressing edge, in the material blank is continued substantially homogeneously, in particular linearly (embracing a possibly slight angular offset)—by the surface course of the sealing material—and the sealing material is adhesively connected to the material blank (is vulcanized on).

In particular, the sealing material is shaped, in a region adjoining the press-off edge, such that in this region a surface course of the sealing material in the cross-sectional direction is homogeneous and has a homogeneous curvature producing an edgeless change of direction of the surface course, in particular between 75° and 105°.

In particular, the multifunctional tool is tempered during the vulcanization step according to a predetermined cross-linking curve.

For a necessary adhesion quality of the sealant to the carrier material of the material blank, an adhesive is preferably provided on the material blank.

A closure element acquired by implementation of the above method, in particular wherein the closure element is configured according to a previously mentioned embodiment, is likewise the subject of the present invention.

BRIEF DESCRIPTION OF THE DRAWINGS

The method according to the invention and the device according to the invention are described in greater detail below on a purely exemplary basis with reference to concrete illustrative embodiments represented schematically in the drawings, wherein further advantages of the invention are also discussed. More specifically:

FIG. 7 is a cross-sectional side view showing the receptacle in a side of the closure element.

DETAILED DESCRIPTION

Figure 1A:
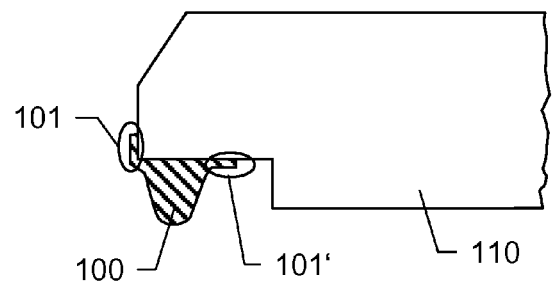
FIGS. 1a-b show a detail of a closure element according to the prior art in cross section.
Figure 1B:
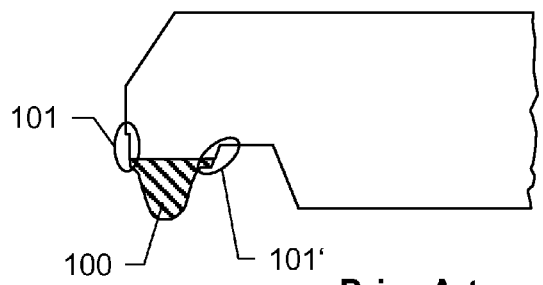
Figure 2:
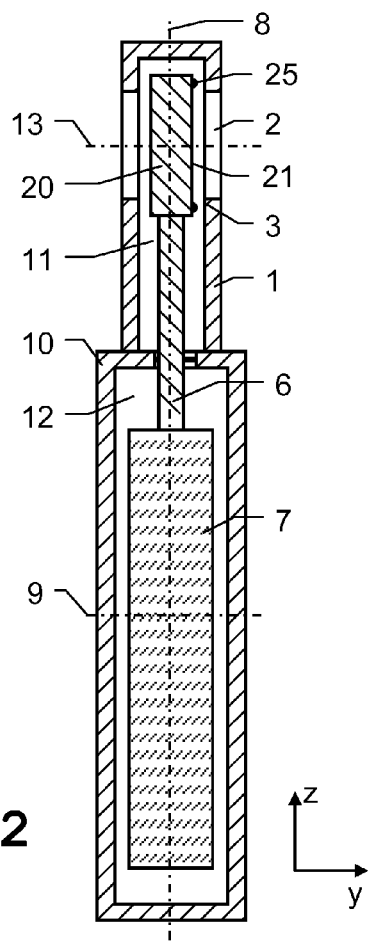
FIG. 2 shows a first embodiment of an L-type vacuum gate valve according to the invention in an intermediate position of the closure element in schematic cross-sectional side view.

In FIG. 2, a first embodiment of a vacuum gate valve according to the invention is represented. The vacuum gate valve possesses a valve housing 10 having a valve wall 1, which latter has an opening 2 having an opening axis 13 and having an elongate, substantially rectangular valve seat 3 surrounding the opening 2. A closure element 20 having a closure side 21, which latter is provided, in particular, on the process side and has a somewhat larger cross section then the opening 2, serves for the substantially gastight closure of the opening 2 by pressing of the closure side 21 onto the valve seat 3. The closure element 20 is supported by two mutually parallel valve rods 6. Since the valve rods in FIG. 2 are shown in side view, only one valve rod 6 is evident there. According to alternative embodiments according to the invention, it is also possible for just a single valve rod 6 to be provided and for the closure element 20 to be supported by this same.

The valve housing 10 is divided into a vacuum region 11, in which the opening 2, the valve seat 3 and the closure plate 20 are disposed, and a drive region 12, which lies outside the vacuum region 11. The two valve rods 6 are guided through two gastight bushings, realized as diaphragm seals or diaphragm bellows having seals on their end pieces (for example O-rings), in the valve housing 10 from the vacuum region 11 into the drive region 12. The diaphragm seals or diaphragm bellows are realized such that the valve rods 6 are movable within a certain motional range along a longitudinal axis 8 and a transverse axis 9, while maintaining the gastight seal. Since the drive region 12 is separated in a gastight manner from the vacuum region 11, an atmospheric pressure can prevail in the drive region 12. Abrasive particles present in the drive region 12 cannot make their way into the sensitive vacuum region. In the drive region 12 is disposed a drive unit 7.

The drive unit 7 is configured such that the closure plate 20 is adjustable by displacement of the two valve rods 6, along the geometric longitudinal axis 8, in a longitudinal closing direction z from an open position into the intermediate position (shown here), and by displacement of the two valve rods 6, along the geometric transverse axis 9 running at right angles to the longitudinal axis 8, in a transverse closing direction y from the intermediate position into a closing position, and back (the motion of the closure plate is L-shaped, therefore the designation L-type).

The closure element 20 has a circumferential, vulcanized-on seal 22, which, by means of a compression, is delimited in the direction of the inner region of the closure side 21, i.e. in the direction of that area on the closure side 21 which is shut off by the seal.

Figure 4A:
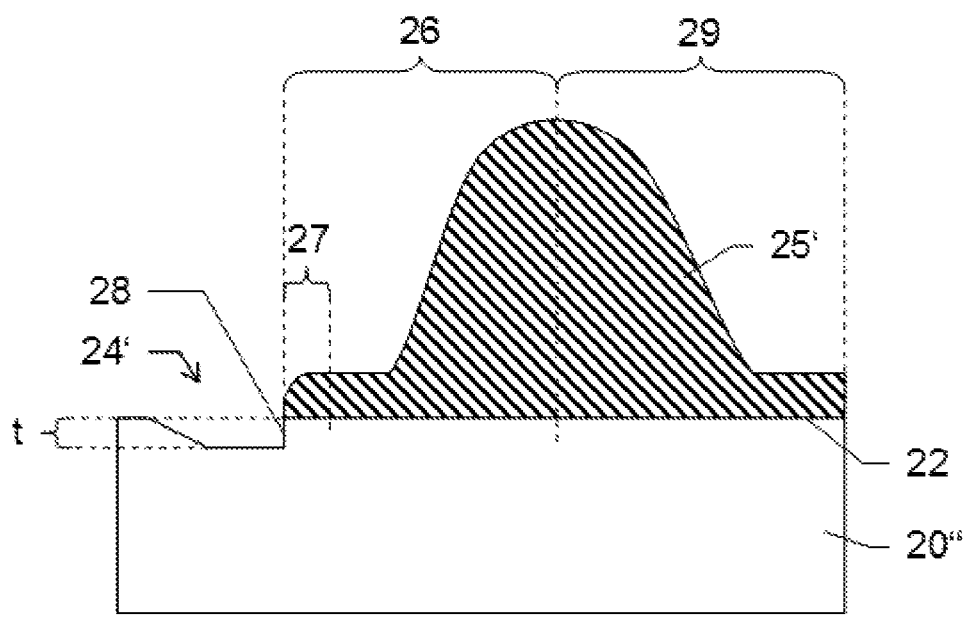
FIGS. 4a-b show two embodiments of a seal vulcanized on a valve disk (closure element) and of a compression according to the invention, adjoining the seal, in cross-sectional view.
Figure 4B:
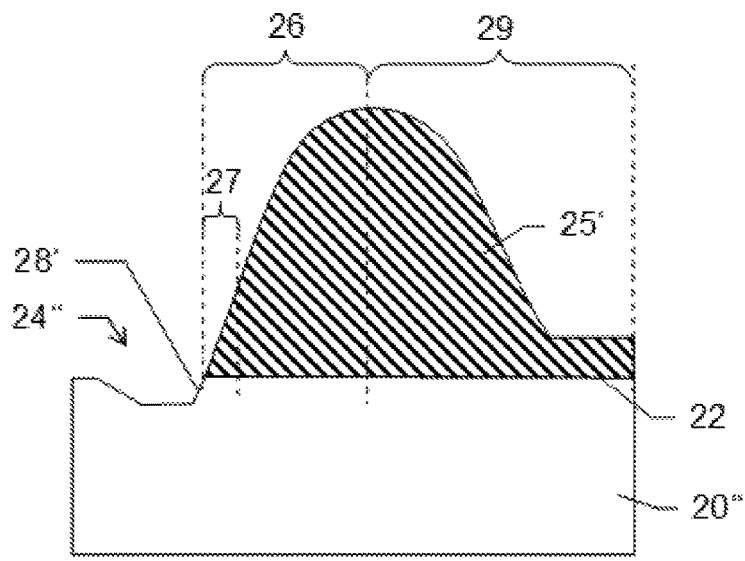

A detailed representation and description of the inventive design of the sealing region and of the seal/metal transition region is set out below (FIGS. 4*a* and 4*b*).

A further embodiment of the invention relates to a valve gate valve (not shown here), which is known, for instance, under the product designation "MONOVAT Series 02 and 03" and, as a transfer valve, designed as a rectangular insert valve, of the company VAT Vakuumventile AG in Haag, Switzerland, has a rectangular opening cross section, the width of which is substantially greater than its height.

Such valve types having complex seal structures are also known, for example from EP 2 420 709 A1 of the Applicant.

Such valves are likewise intended for the gastight closing of a flow path, yet solely by means of a linear motion of the closure element. The closure member is linearly displaceable along a geometric adjustment axis running transversely to the opening axis, in the plane of a closure member, from an opened position which frees the opening into a closed position pushed linearly over the opening, in a motion in a closing direction, and conversely back in an opening direction. In a closing position, the sealing material applied to the sealing surface of the closure element is pressed onto the sealing surface surrounding the opening.

Such a vacuum valve which is known from the prior art and is closable by means of a single linear motion has advantages over the transfer valves, which are closable by means of two motions (FIG. 2) and which have a relatively complexly constructed drive, or over the wedge valves, in which the seals are subjected to transverse load. Since the closure member of the above-described vacuum valve is in one piece, it can be exposed to high acceleration forces, so that this valve can also be used for rapid and emergency closures. The closing and sealing can be effected by means of a single linear motion, so that a very rapid closing and opening of the valve is possible. The circumferential seal, in all its portions, finds clearly reproducible conditions in the diverse closing operations. Since the seal, in the closing operation and with the emergence of the closing pressure, is loaded substantially only in the direction of the linear closing motion in perpendicular direction to the seal or partially in the longitudinal direction, yet not transversely to its longitudinal extent, so that transverse forces on the seal are avoided, this vacuum valve is suitable for high-level sealing functions in the vacuum and high vacuum sector.

According to the invention, the sealing material on the part of the closure element (closure member) is in turn configured by compression and vulcanization, so that the sealing material and the shape of the compression provide a homogeneous transition between metal and sealing material, and reworking following the vulcanization can be dispensed with.

Figure 3A:
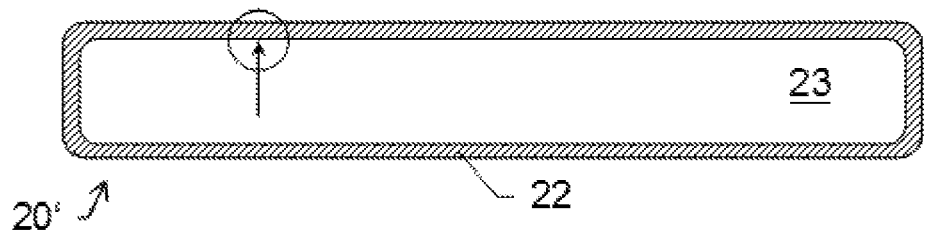
FIGS. 3a-b show an embodiment of a substantially rectangular closure element for a vacuum valve according to the invention in top view representation.

FIG. 3*a* shows a substantially rectangular closure element 20' for a vacuum valve according to the invention, in particular for an L-type vacuum valve, in top view representation. The closure element 20' is constructed of a metal or a metal alloy, for example aluminum or special steel, wherein a sealing surface 22 having a seal applied thereto is provided circumferentially on the rim of the closure element 20'.

The seal is created by means of vulcanization of a cross-linkable sealing material on the sealing surface 22. For this purpose, the sealing surface 22 has been provided, in particular prior to the vulcanization process and the application of the sealing material, with an adhesive layer, for example an adhesive agent or primer, in order to provide an appropriately good adherence of the seal on the carrier material of the closure element 20'. Alternatively or additionally, the sealing surface 22 can itself be pretreated in order to provide the required adhesive properties. Such pretreatment can be conducted, for instance, by mechanical roughening, by etching of the surface or by irradiation of the surface with a plasma, corona treatment or UV irradiation. Generally speaking, on the sealing surface 22 prior to application of the sealing material, a surface state is established—whether by means of a surface treatment or by the creation of an additional adhesive layer—which surface state provides the required adhesion.

The area 23 which is enclosed by the sealing surface 22 or the vulcanized-on seal is that region of the closure element 20' which, in the intended use of the closure element 20' in a vacuum valve, is facing toward the process volume to be shut off, wherein, moreover, in a closing position of the valve, a part of the seal likewise remains facing toward the process volume.

The dimensioning and shape of the seal tapers in the direction of the enclosed area 23 into a compression in the closure element 20'. This transition (cf. arrowed region) is represented schematically, likewise in top view, in FIG. 3*b*.

Figure 3B:
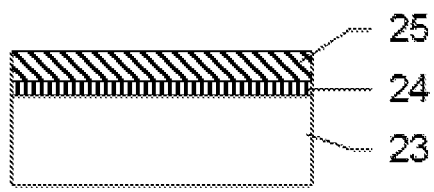

As can be seen from FIG. 3*b*, the applied seal 25 adjoins a compression 24 in the material. The compression passes further along into the uncoated, and in the course of the creation of the seal 25, unworked, free closure element area 23.

FIG. 4*a* shows in cross sectional view a seal 25' vulcanized onto a valve disk 20''' (closure element) and, adjoining the seal, a compression 24' according to the invention. The sealing material 25' has a first seal portion 26 and a second seal portion 29, which in the shown embodiment—since this, in use with a corresponding vacuum valve, lies on the side of the process volume which is intended to be shut off—constitutes the sensitive seal portion in terms of particle residues and contamination. The seal is produced such that reworking after the sealing material 25' has been vulcanized on is unnecessary, at least for this portion 26, and thus no particles or burrs are formed, for example by material removal.

The first seal portion 26 further has a region 27 which adjoins the compression 24' in the valve disk 25''' and can be regarded as critical with respect to a possibly necessary reworking operation.

At least in this region 27, the surface of the sealing material 25' runs homogeneously without forming an edge. Moreover, the surface course here has a homogeneous curvature (in particular without a turning point), whereby a continuous change of direction of the surface course, here of around 90°, is produced.

Moreover, the compression 24' has a pressing edge 28, which, in terms of its direction and position relative to the sealing material, is configured such that the homogeneous surface course of the sealing material 25' is continued just as homogeneously and linearly by the pressing edge 28. The transition from sealing material 25' to the carrier material of the closure element 20" is here shaped substantially without interruption or discontinuity of the common surface lines.

Such a transition, comprising just such a homogeneous surface course in the region 27 and comprising a continuation of this course by a specific shaping of the pressing edge 28, is created according to the invention by means of a special tool (described below) already during the process of applying the sealing material and the vulcanization process and obviates the need for reworking for the removal of excess sealing material, at least for this region.

Should reworking of the sealing material and/or of the carrier material in accordance with the prior art be necessary, then such a homogeneous course would be unattainable due to resulting machine cutting operations and burr formation.

Moreover, the sealing material 25' has a surface roughness which substantially corresponds to that of the tool surface and is thus is significantly lower than in embodiments of the prior art (for instance $R_a=0.05$ or 0.1 µm). According to the invention, a closure element for a vacuum valve, which closure element has improved material quality and neatness, is thus provided.

Moreover, the compression has a particular depth t with respect to the surface of the closure element 20". This depth is defined by a tool structure which creates the compression, and lies round about, for instance, t=0.2 mm. Preferably, the pressing edge 28 has a corresponding length in the direction of (parallel to) the surface normal of the sealing surface 22.

FIG. 4b shows a further embodiment of the closure element 20" according to the invention. At variance with the embodiment according FIG. 4a, the pressing edge 28' of the compression 24" is not guided parallel to the surface normal of the sealing surface 22, but is shaped at an angle thereto, though a homogeneous transition of the course of the seal surface is maintained by means of the course of the pressing edge 28'.

An alternative, inventively embraced embodiment is also conceivable (not shown), with respect to which the direction of the pressing edge has a slight angular offset to the tapering surface line of the sealing material. An embodiment of this type should be perceived within the scope of the present invention as a substantially homogeneous continuation of the surface course.

Figure 5A:
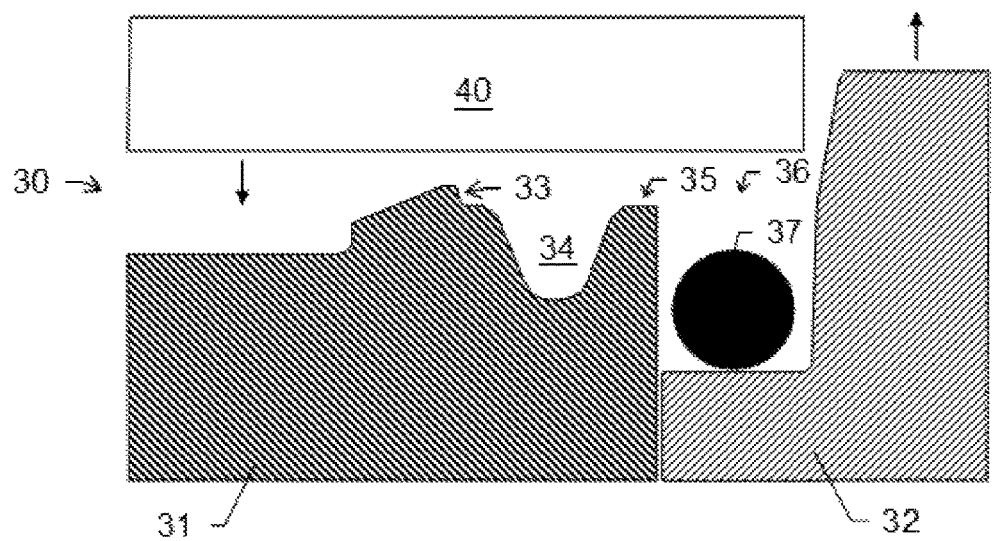
FIGS. 5a-b show a tool according to the invention for manufacturing a closure element according to the invention, in an open tool state and a closed tool state.
Figure 5B:
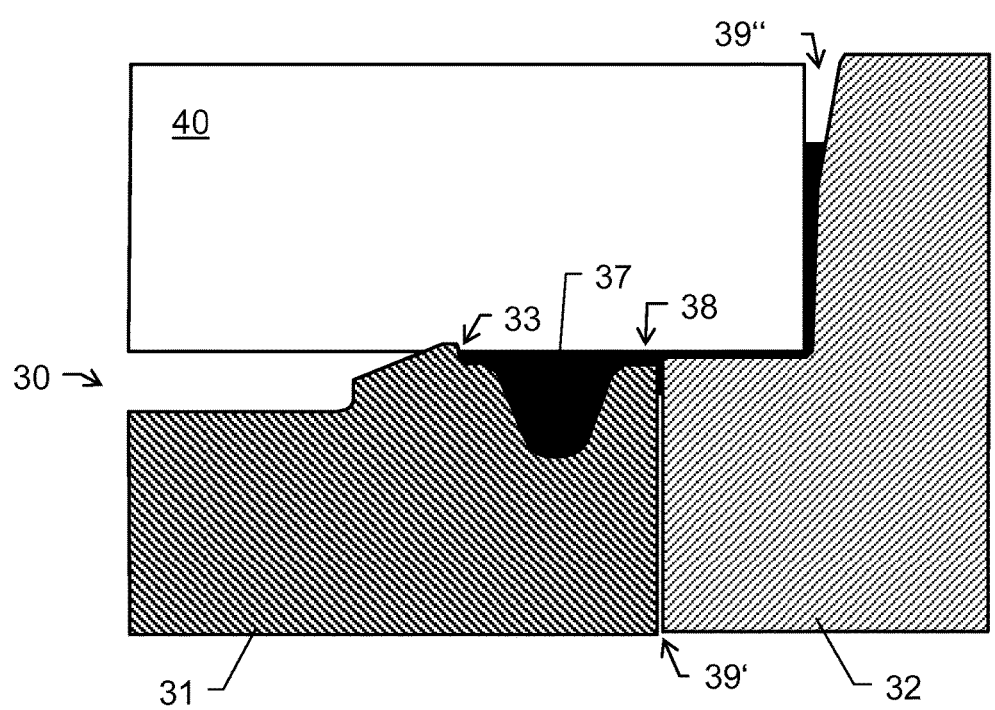

FIGS. 5a and 5b show a tool 30 according to the invention in an open tool state (FIG. 5a) and a closed tool state (FIG. 5b).

The tool has a forming part 31 and a bottom part 32. In addition, the forming part 31 has a recess 34, which at one end is delimited by a press-off edge 33 of the forming part 31 and at the second end is kept open by a provided slot 35. Moreover, a receptacle 36 for the sealing raw material 37, for example a cord produced from the sealing material, is provided, wherein this receptacle 36 is here assigned to the bottom part 32 or to an interspace between the bottom part 32 and the forming part 31.

Also shown in a material blank 40, which, in cooperation with the tool 30, is to be compressed by means of the press-off edge 33 and, moreover, is to be provided with the sealing material. The blank 40 consists, for instance, at least partially of aluminum, an aluminum alloy, steel, special steel, or an alternative suitable metal alloy. In particular, the blank 40 embodies at least a part of a closure element for a vacuum valve, wherein that side of the closure side which is to be provided with the sealing material, i.e. the side which is facing toward a process volume to be shut off, interacts with the forming part 31.

Upon closing of the tool 30, the material blank 40 is moved in the z direction up to the forming part 31 and the press-off edge 33 is pressed into the material. The contact pressure and the maximum press stroke are adjustable by pressure regulating elements, for example cup springs, and an appropriate stop. Moreover, the bottom part 32 of the tool 30 is displaced in the opposite direction, so that the volume of the receptacle 36 is reduced and the sealing raw material 37 makes its way into the recess 34 via an overflow 38 which, when the tool 30 is closed, remains as a result of the slot 35.

In the closed tool state (FIG. 5b), the (compressed) press-off edge 33 of the forming part 31 can be seen, which press-off edge engages in the blank 40 and, as a result of the compression, procures a close-off of the recess 34 that is leak-tight for the sealing raw material 37. The space of the recess 34 is completely filled with the sealing raw material 37.

As a result of the specific design of the tool 30, between the forming part 31 and the bottom part 32 and between the bottom part 32 and the material blank 40 gaps 39',39" are respectively kept open, so that excess sealing material can be led off through these.

Precisely that material excess must be removed after the vulcanization process. The removal is effected by means of trimming of the appropriate places, whereby impurities and burrs remain at these places. According to the prior art, an analogous trimming is necessary also for the opposite side of the seal, since here too gaps are provided for the evacuation of excess sealing material and material residues of this type are formed. Only as a result of the inventive pressing-off of the seal form at the first end of the recess 34, whereby a material overflow is prevented there, can such reworking, at least on this side, be relinquished.

In this closed tool state, the sealing raw material 37 can be fully vulcanized after the tool 30 has been closed. As a result, the sealing raw material 37 is cross-linked, whereby a seal which is stable and adheres to the material blank 40 is created.

Self-evidently, the represented figures show schematically only possible illustrative embodiments. According to the invention, the various approaches can equally be inter-combined and combined with methods and devices of the prior art for the closure of process volumes under vacuum conditions.

Figure 6A:
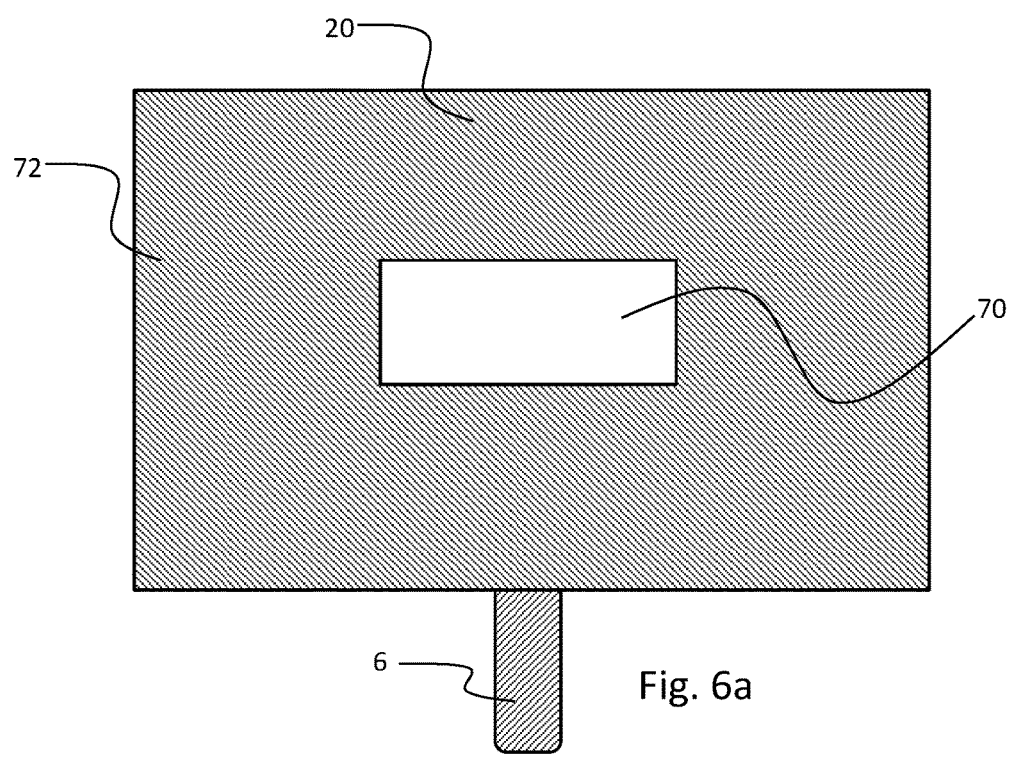
FIG. 6a shows a back view showing the side opposite of the closure side, with a grip recess for a push rod.

FIG. 6a shows a further embodiment of the invention, where the closure element 20 has a grip recess 70, which is shaped in a side 72 lying opposite the closure side 21 with the vulcanized-on sealing material (of the closure element e.g., 25), for the manual application of force to the closure plate substantially along the push rod axis, in particular for the removal or mounting of the closure plate (e.g., closure element 20) from or on the push rod 6. For improved handling of the closure element 20 during disassembly, for example, grip recess as shown, for instance, is shaped in the side 72 opposite the closure side 21 in order to be able to manually apply a force to the closure element 20 in a substantially upward direction for removal of the closure plate (e.g., closure element 20) from the push rod 6 and/or for better handling of the closure plate following disassembly. The grip recesses 70 can be provided on the inside with a non-slip coating for improved grip. FIG. 6*a* shows a back view showing the side 72 opposite of the closure side 21, with the grip recess 70.

FIG. 7 shows a further embodiment according to the invention, where the closure element 20 has a coupling for connecting to a drive unit 7 of a vacuum valve in order to provide a controlled motion of the closure element 20 in the vacuum valve, in particular a receptacle 80 for a push rod 6 (shown in dashed lines in FIG. 7 for clarity) of the drive unit 7. In particular, the receptacle 80 is shaped in the side 82 of the closure element 20 (with respect to a closure side 21 of the closure element 20), for the removable mounting of the closure element 20 on the push rod 6 by engagement of a connecting portion 6*a* of the push rod 6 in the receptacle 80. Moreover, the push rod 6 is supported and adjustable by means of the drive unit 7 in particular such that the valve opening is closable by displacement of the closure element 20 substantially along the push rod axis over a valve opening and pressing of the closure element 20 with its sealing material onto a valve seat surrounding the valve opening 2. By virtue of this coupling, the closure element 20 is thus specifically configured for use in a vacuum valve, in particular of the L-type, and can thereby be connected to the drive unit 7 and moved in the valve according to a defined pattern. FIG. 7 is a cross-sectional side view showing the receptacle 80 in a side of the closure element 20.

What is claimed is:

1. A closure element for a vacuum valve and configured for the gastight close-off of a process volume by means of cooperation with a vacuum valve opening, provided for the process volume of the vacuum valve, the closure element comprising:
   a first sealing surface corresponding to a second sealing surface of the vacuum valve opening wherein the second sealing surface surrounds the vacuum valve opening; and
   a sealing material vulcanized onto the first sealing surface and in accordance with the course thereof and having a defined height in the direction of the surface normal of the first sealing surface, wherein the sealing material has a defined shape with respect to a sealing material cross section, the sealing material comprising:
      a first seal portion provided on a process volume side of the closure element and facing towards the process volume; and
      a second seal portion provided facing away from the process volume;
   wherein the closure element has a compression pressed into the first sealing surface of the closure element, adjoining the first seal portion and the compression having a pressing edge extending from a bottom of the compression to the first sealing surface; and
   wherein the pressing edge is shaped, and is configured with respect to the first seal portion, such that the surface course of the sealing material, which surface course is given by the shape of the first seal portion and tapers into the pressing edge, is continued substantially homogeneously by the pressing edge,
   wherein the entirety of the sealing material is outside of the compression,
   wherein the first seal portion is shaped, in a region adjoining the compression, such that in this region the surface course of the sealing material is homogeneous and has a homogeneous curvature which produces an edgeless change of direction of the surface course.

2. The closure element according to claim 1, wherein: the edgeless change of direction of the surface course is between 75° and 105°.

3. The closure element according to claim 2, wherein: the curvature is free from turning points has a constant direction of curvature, and/or
   the change of direction of the surface course in the region adjoining the compression amounts substantially to 90°.

4. The closure element according to claim 1, wherein: the compression has a depth in the direction of the surface normal of the first sealing surface and with respect to the surface of the first sealing surface within the range from 0.15 to 0.25 mm.

5. The closure element according to claim 1, wherein: the pressing edge has a length between 0.15 mm and 0.25 mm.

6. The closure element according to claim 1, wherein: the pressing edge runs substantially parallel to the surface normal of the first sealing surface.

7. The closure element according to claim 1, wherein: the first seal portion has, at least in the region adjoining the compression, a mean surface roughness Ra between 0.02 µm and 0.15 µm.

8. The closure element according to claim 1, wherein: the first seal portion has, at least in the region adjoining the compression, a mean surface roughness Ra between 0.05 µm and 0.1 µm.

9. The closure element according to claim 1, wherein: the first seal portion has, at least in the region adjoining the compression, an average surface roughness depth Rz between 0.2 µm and 1.5 µm.

10. The closure element according to claim 1, wherein: the first seal portion has, at least in the region adjoining the compression, an average surface roughness depth Rz between 0.5 µm and 1 µm.

11. The closure element according to claim 1, wherein: the sealing material has an elastomer.

12. The closure element according to claim 1, wherein: the sealing material has a fluoroelastomer.

13. The closure element according to claim 1, wherein: the closure element comprises a receptacle for connecting to a push rod of a drive unit of the vacuum valve in order to provide a controlled motion of the closure element in the vacuum valve, wherein:
   the receptacle is shaped in the side of the closure element, for the removable mounting of the closure element on the push rod by engagement of a connecting portion of the push rod in the receptacle, and
   the push rod is supported and adjustable by means of the drive unit such that the vacuum valve opening is closable by displacement of the closure element substantially along the push rod axis over the vacuum valve opening and pressing of the closure element with its sealing material onto a valve seat surrounding the vacuum valve opening.

14. The closure element according to claim 1, wherein: the closure element comprises at least one grip recess, which is shaped in a side lying opposite a closure side with the vulcanized-on sealing material of the closure element, for the manual application of force to the closure element substantially along a push rod axis.

15. A vacuum valve for the gastight close-off of a process volume, comprising:
   a valve housing, which has a vacuum valve opening and a valve seat surrounding the vacuum valve opening and having a second sealing surface;

a closure element for the substantially gastight closure of the vacuum valve opening, having a first sealing surface corresponding to the second sealing surface, wherein the first sealing surface has a vulcanized-on sealing material having a defined height in the direction of the surface normal of the first sealing surface, and the sealing material has a defined shape with respect to a sealing material cross section, the sealing material having:
- a first seal portion provided on a process volume side of the closure element and facing towards the process volume, and
- a second seal portion provided facing away from the process volume; and a drive unit coupled with the closure element, which drive unit is configured such that the closure element is adjustable at least substantially along a geometric longitudinal axis in a longitudinal closing direction from an open position, in which the closure element frees the vacuum valve opening, into a closing position, in which the first sealing surface of the closure element is pressed onto the second sealing surface and closes the vacuum valve opening in a substantially gastight manner, by virtue of a mobility of the closure element substantially along a geometric transverse axis running at right angles to the longitudinal axis, is adjustable in a transverse closing direction into an intermediate position, in which the closure element covers the vacuum valve opening and a closure side of the closure element is in a remote opposite position to the valve seat, and back;

wherein the closure element has a compression adjoining the first seal portion and having a pressing edge, wherein the compression is pressed into the first sealing surface of the closure element and the pressing edge that extends from a bottom of the compression to the first sealing surface, and wherein the pressing edge is shaped, and configured with respect to the first seal portion, such that the surface course of the first seal portion, which surface course is given by the shape of the first seal portion and tapers into the pressing edge, is continued substantially linearly by the pressing edge, wherein the entirety of the sealing material is outside of the compression, wherein the first seal portion is shaped, in a region adjoining the compression, such that in this region the surface course of the sealing material is homogeneous and has a homogeneous curvature which produces an edgeless change of direction of the surface course.

* * * * *